E. CULVER.
Vegetable Cutter.
No. 65,177.
Patented May 28, 1867.
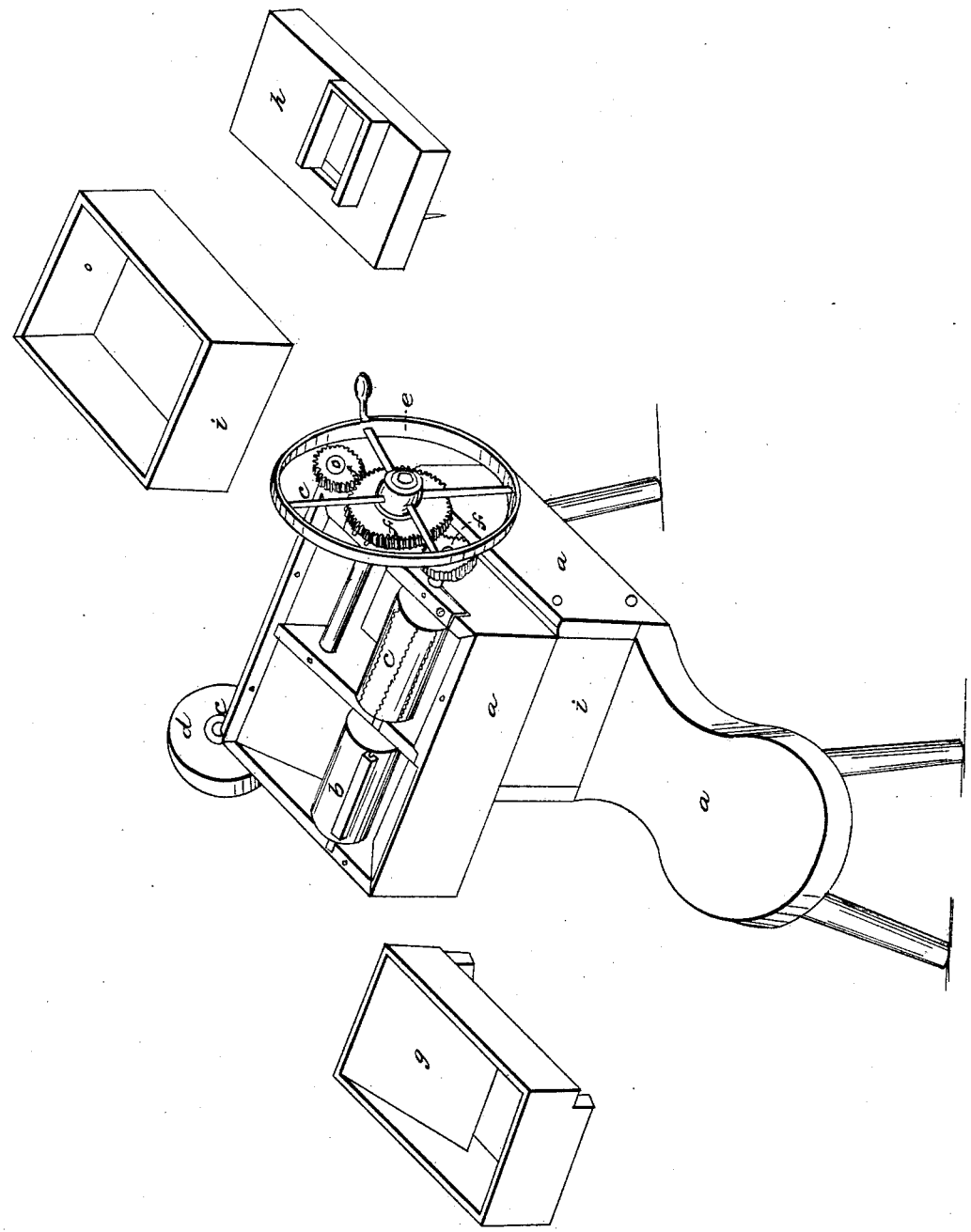
WITNESSES:
Arthur Maxwell
Thos. E. Warren
INVENTOR:
Ephraim Culver

United States Patent Office.

EPHRAIM CULVER, OF SHELBURNE FALLS, MASSACHUSETTS.

Letters Patent No. 65,177, dated May 28, 1867.

IMPROVED CUTTER, GRATER, AND SHARPENER.

The Schedule referred to in these Letters Patent and making part of the same.

TO ALL WHOM IT MAY CONCERN:

Be it known that I, EPHRAIM CULVER, of Shelburne Falls, in the county of Franklin, and State of Massachusetts, have invented a new and useful Machine for Cutting and Grating Fruits and Vegetables, and for Sharpening Knives and other cutlery; and do hereby declare that the following is a full and exact description thereof, reference being had to the accompanying drawings, and to the letters of reference marked thereon.

My invention consists in combining and arranging a movable drawer with a revolving cylinder, having several rows of teeth of unequal length, sharpened as transverse-saw teeth, and projecting from the cylinder, with another revolving cylinder having knives attached to it, and with a grindstone for sharpening knives and other cutlery, so that the operations of cutting and grating and sharpening may be performed at one and the same time, or separately.

To enable others to make and use my invention, I now proceed to describe its construction and operation.

My machine consists of a box marked $a\ a\ a$, standing upon legs, and divided into two compartments, having the revolving cylinder $b$, with knives attached, in one compartment, and the revolving cylinder $c$, with the transverse-saw teeth of unequal length projecting from it, in the other compartment, and the movable drawer $i$, represented also separately, underneath, with the covers $h$ and $g$ also represented removed. By turning the wheel $e$, motion is communicated through the cog-wheels $f\ f\ f$ to the cylinders $b$ and $c$, and to the grindstone $d$, so that the cylinders and grindstone revolve.

What I claim as my invention, and desired to secure by Letters Patent, is—

The arrangement and combination of the revolving cylinder $c$, having its projecting end transverse-saw teeth of unequal length, and the cylinder $b$ with the knives attached to it and the grindstone $d$, substantially as and for the purposes described.

EPHRAIM CULVER.

Witnesses:
ARTHUR MAXWELL,
THOS. E. WARREN.